US008288653B2

(12) United States Patent
Stroh et al.

(10) Patent No.: US 8,288,653 B2
(45) Date of Patent: Oct. 16, 2012

(54) CONNECTING PASSAGE NODE OR END NODE AND METHOD FOR PRODUCTION THEREOF

(75) Inventors: Dieter Stroh, Wettenberg (DE); Heiko Stroh, Wettenberg (DE); Udo Wagenbach, Buseck (DE)

(73) Assignee: Schunk Sonosystems GmbH, Wettenberg (DE)

( * ) Notice: Subject to any disclaimer, the term of this patent is extended or adjusted under 35 U.S.C. 154(b) by 727 days.

(21) Appl. No.: 12/226,984

(22) PCT Filed: May 4, 2007

(86) PCT No.: PCT/EP2007/054340

§ 371 (c)(1), (2), (4) Date: Mar. 12, 2009

(87) PCT Pub. No.: WO2007/128790

PCT Pub. Date: Nov. 15, 2007

(65) Prior Publication Data

US 2009/0218134 A1 Sep. 3, 2009

(30) Foreign Application Priority Data

May 5, 2006 (DE) ......................... 10 2006 021 422

(51) Int. Cl.
*H01R 9/05* (2006.01)
*H02G 15/04* (2006.01)
*H02G 15/013* (2006.01)

(52) U.S. Cl. .................................... 174/74 R; 174/88 R

(58) Field of Classification Search ................ 174/74 R, 174/88 R

See application file for complete search history.

(56) References Cited

U.S. PATENT DOCUMENTS

| | | | | |
|---|---|---|---|---|
| 1,959,150 | A * | 5/1934 | Basch et al. | 219/85.15 |
| 2,748,452 | A * | 6/1956 | Pierce | 29/865 |
| 3,253,250 | A * | 5/1966 | Comlossy et al. | 439/675 |
| 3,521,224 | A * | 7/1970 | Spooren | 439/730 |
| 3,717,842 | A * | 2/1973 | Douglas, Jr. | 29/860 |
| 4,302,065 | A * | 11/1981 | Taylor | 439/470 |
| 5,796,045 | A * | 8/1998 | Lancien et al. | 174/109 |
| 2002/0162683 | A1* | 11/2002 | Fujiwara | 174/74 R |
| 2004/0003498 | A1* | 1/2004 | Swearingen et al. | 29/862 |
| 2004/0088857 | A1* | 5/2004 | Fujimoto et al. | 29/871 |
| 2007/0000890 | A1* | 1/2007 | Steiner et al. | 219/124.34 |
| 2008/0032569 | A1* | 2/2008 | Steiner et al. | 439/874 |

FOREIGN PATENT DOCUMENTS

DE 27 23 029 11/1978

(Continued)

*Primary Examiner* — Timothy Thompson
*Assistant Examiner* — Nathan Milakovich
(74) *Attorney, Agent, or Firm* — Dennison, Schultz & MacDonald

(57) ABSTRACT

The invention relates to method for producing a connecting passage node or end node which has a rectangular shape in cross section and consists of electrical conductors. The nodes are produced by compacting and subsequent welding of the conductors by means of ultrasound in a compression chamber of the ultrasound welding machine of which the height and width can be adjusted and which has a rectangular shape in cross section, wherein opposite delimitation surfaces of the compression chamber form sections of a sonotrode and an opposite counter electrode, respectively. To connect electrical conductors which are difficult to weld to an end node and/or connecting passage node, the conductors (50, 52, 54) are brought into a sleeve and, subsequently, the sleeve (62, 65) is welded with the conductors in the compression chamber to form the end node and/or connecting passage node (49) having a rectangular cross section.

18 Claims, 7 Drawing Sheets

FOREIGN PATENT DOCUMENTS

Figure 1:
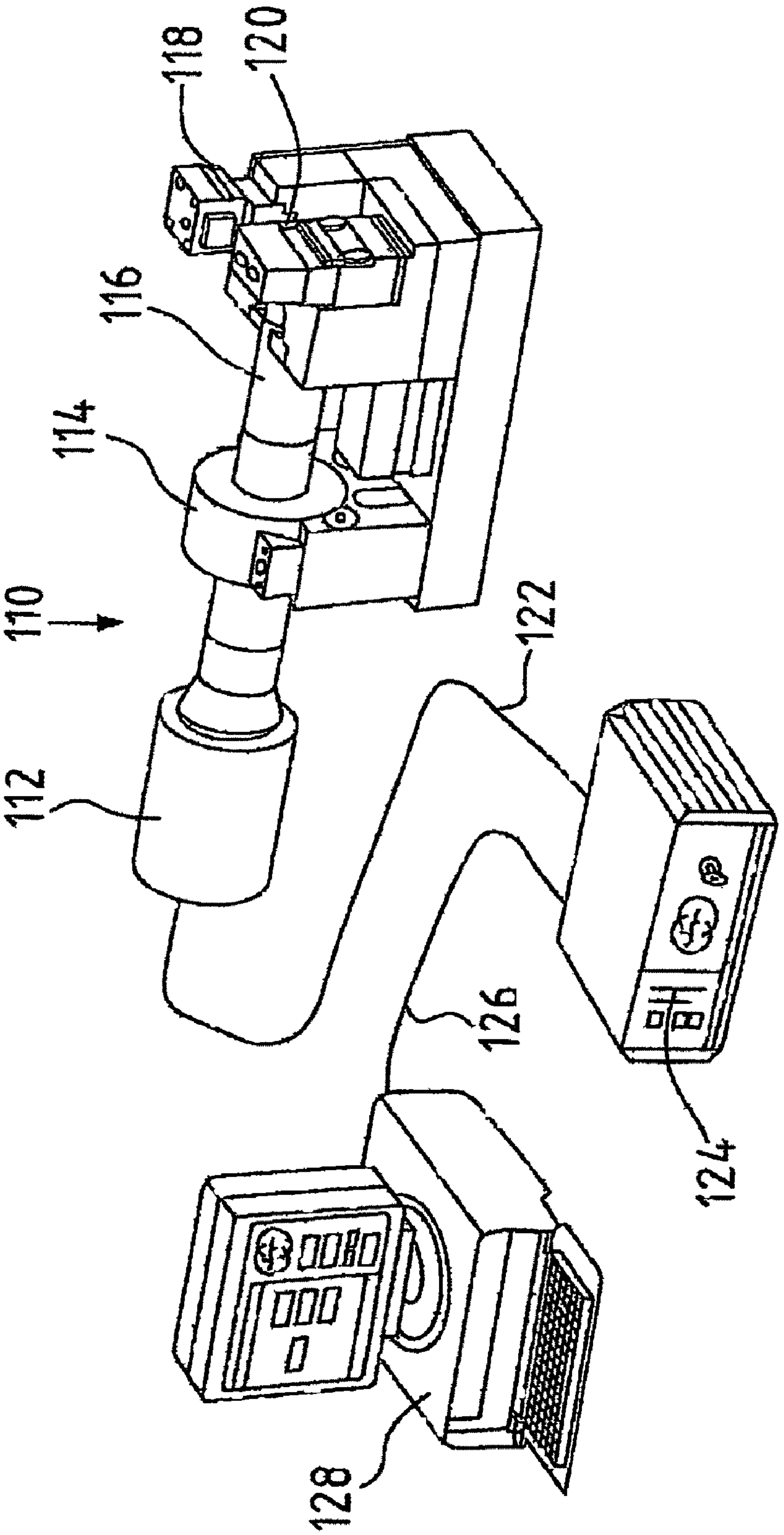

| | | | | |
|---|---|---|---|---|
| DE | 4110455 | A1 | * | 10/1992 |
| DE | 198 29 761 | | | 1/2000 |
| DE | 101 23 636 | | | 12/2002 |
| DE | 10123636 | A1 | * | 12/2002 |
| DE | 102004044480 | A1 | * | 2/2006 |
| EP | 0 133 883 | | | 3/1985 |
| EP | 133883 | A1 | * | 3/1985 |
| JP | 2005129326 | A | * | 5/2005 |
| JP | 2005-228603 | | | 8/2005 |
| JP | 2005302340 | | | 10/2005 |
| WO | WO 2004/004079 | | | 1/2004 |
| WO | WO 2006/010551 | | | 2/2006 |

* cited by examiner

CONNECTING PASSAGE NODE OR END NODE AND METHOD FOR PRODUCTION THEREOF

The invention relates to a procedure for producing a connecting passage node or end node having a polygonal—such as rectangular—geometry, consisting of electric conductors such as strands through compacting and subsequent welding of the conductors in a compression chamber adjustable in height and/or breadth and polygonal such as rectangular in cross section of a welding welding machine such as an ultrasonic welder, wherein opposite delimitation surfaces of the compression chamber form sections of an electrode like a sonotrode and a counterelectrode, opposite this. Also the invention makes reference to a connecting passage node or end node, consisting of electrical conductors compressed and welded to each other, whereby the connecting passage node or end node has a polygonal, such as cuboid, form.

A corresponding ultrasonic welding process can be gleaned from EP-B-0 723 713. The manufactured connecting passage nodes or end nodes exhibit high strength due to their cuboid form. Also resulting from this is the possibility of a standardized installation or circuitry.

One principal design of an ultrasonic welding device with a compression chamber adjustable in height and width can also be gleaned from DE-C-37 19 083 or WO-A-2006/010551. With them, either strands only can be connected with each other, or strands and inherently rigid carriers.

From DE-A-103 36 408, a procedure is known for connecting an electrical cable with a sleeve-shaped connecting element, whereby the electrical cable is inserted into the insertion hole of the sleeve and then pressed together radially inward, to pinch in the inserted section of electrical cable uniformly over its entire circumference, and then to connected the sleeve-shaped connecting element with a contact element through ultrasonic welding. To uniformly pinch the electrical cable, a swaging machine is used.

To manufacture an electrically conducting connection of wires provided with an insulating paint, DE-B-102 29 565 proposes that they be surrounded by a sleeve that is placed with the painted wires between the anvil and a sonotrode of an ultrasonic welding device and then be deformed and welded. The obtainable result is a connection that is elliptical or oval-shaped in cross section.

In welding conductors of differing material properties, or conductors having very thin strands, it must be stated that the weld quality often does not satisfy the set requirements, or the requisite inner connection cannot be produced, or the thin strands break off. Therefore, it is the task of the present invention to connect electrical conductors that are difficult or impossible to weld as per the state of the art to an end node or connecting passage node, that in cross section has a polygonal, such as rectangular, geometry. According to a further aspect of the invention, in doing so the node should endure high mechanical and dynamic loads, to ensure that damage to the conductors is avoided and conductors with varied material properties or materials can be welded in the required quality.

To solve the problem, the invention in essence makes procedural provision that the conductors be inserted into a sleeve consisting of especially electrically conducting material or metal, and then the sleeve is welded with the conductors in a compression chamber to the end node or connecting passage node of a polygonal, such as rectangular, cross section.

By the conductors being able to be inserted into the sleeve, a possibility arises that the former consist of differing materials or can exhibit differing material properties, that according to the state of the art either cannot or only with difficulty be welded, making it possible to implement welding into an end node or connecting passage node of high strength. Even strands that are fine or very fine wires can be welded without damage to the individual cores. The sleeve itself offers additional mechanical protection from high-level mechanical and dynamic loads. This ensures that, independent of the initial form of the sleeve, these can, with the conductors, be deformed and welded into the end nodes or connecting passage nodes of a polygonal column geometry, especially cuboid shaped.

Owing to the sleeve there arises also the advantage that materials can be welded that otherwise tend to adhere to the tools of the ultrasonic welding machine.

A possibility exists to intimately join among and with each other aluminum conductors, coated conductors like copper-plated aluminum conductors, that consist of a core of aluminum, that is surrounded by a copper layer, tin-plated conductors or conductors of ferrous product like high-grade steel, an option which is not known in the state of the art without additional processing steps. Also, solid conductors and strands can be welded to each other with no problems.

According to the invention, joining can be done in a customary compression chamber of an ultrasonic welding device, as can be gleaned, for example, from EP-B-0 723 713, which in height and width can be adapted to sleeves of varied cross sections. Welding with a resistance welding device is also possible.

Various conductors—virtually a material mix—can also be processed, also with solid wires, without having to make allowances for disadvantages.

Provision especially is made that the conductors can be inserted for example into a sleeve having the geometry of a hollow cylinder, whereby as a sleeve one can be used that is closed at one end, to produce an end node, or is open at both ends for insertion of conductors, to form an end node or connecting passage node. The sleeve does not have to be closed. For example, a body with a U-shaped geometry is also conceivable, from whose lateral edges bendable laminar sections project, that during welding come to lie on one another and are welded.

In particular, the invention makes provision that the sleeve is so deformed that the delimitation surfaces, running perpendicular to the sections of the sonotrode and counterelectrode, of portions adjoining the compression chamber are partially folded inwards through crushing. From this there results an especially great stability and secure connection to the conductors admitted by the sleeve.

To ensure that the conductors admitted by the sleeve do not break off, and thus tolerate high-level mechanical and dynamic loadings, a further embodiment makes provision that prior to welding, the open end of the sleeve which does not have to be closed all around, expands in trumpet fashion, which during manufacture of the end node or connecting passage node may remain outside the compression chamber.

According to a further embodiment of the invention, it is proposed that the open end of the sleeve have a surrounding reinforced edge like a bead, that remains outside the compression chamber during the welding.

Owing to the trumpet-shaped expansions or bead-like edge configuration on the open ends of the sleeves, there additionally arises the advantage that the conductors do not snap off on sharp edges. At the same time, the conductors to be welded are easier to mount.

All these measures ensure that the conductors drawn out of the sleeve can endure high-level mechanical loads.

The sleeve consists of a material which deforms during the welding process, especially by means of ultrasound, and can be welded to the conductors.

Such sleeves are preferentially used that have wall thicknesses in the range between 0.05 mm and 0.5 mm, preferably between 0.15 mm and 0.4 mm. Copper sleeves or copper silver-coated sleeves are named as preferred materials.

To achieve reproducible welding results, or to simplify monitoring of the compaction and welding, a further embodiment of the invention to be emphasized makes provision that the sleeve is positioned with a pre-set length in the compression chamber. This can be implemented by providing a catch that interacts with a projection from the sleeve or an element that has the same action. Especially we are dealing here with the trumpet-shaped expansion or bead-like edge, which limits inward shifting into the compression chamber when interacting with an appropriately placed catch. If a trumpet-shaped expansion or a bead-like edge is used, then the catch can be configured for example as a cover, that is placed in front of the compression chamber in the slide-in direction of the sleeve.

In addition, especially an end node can be surrounded by an insulating cap that has a circumferential projection, that locks between the free end of the sleeve and the insulation of electrical conductors that is at an interval to it. The possibility also exists that an insulating cap has a circumferential, groove-like recess into which the trumpet-shaped or bead-like edge of the sleeve engages in locking fashion when the insulating cap is slid on.

A connecting passage node or end node consists of electrical conductors sealed with each other and welded, whereby the connecting passage node or end node has the form of a polygonal column such as a cuboid. It is characterized in that the electrical conductors are surrounded by a sleeve with an exterior geometry shaped like a polygonal column or cuboid, that is the outer layer of the connecting passage node or end node.

On its end geometry, the sleeve as a part of the connecting piece node or end node especially has a hollow cuboid geometry, whereby opposite lateral walls are each folded inward in sectional fashion. By this means, high-level mechanical strength is achieved.

Especial provision is made that the end of the sleeve expands like a trumpet or its open end is reinforced like a bead.

The end node can be surrounded by an insulating cap with a surrounding projection extending out from its inner surface, which engages in the intermediate space between the end of the sleeve on the conductor side and the insulations of the conductor running at a distance to it.

Further particulars, advantages and features of the invention are obtained not only from the claims, the features to be gleaned from these—per se and/or in combination, but also from the following description of the preferred embodiment examples to be taken from the drawings.

Shown are:

FIG. 1: a depiction in principle of an ultrasonic welding device

Figure 2:
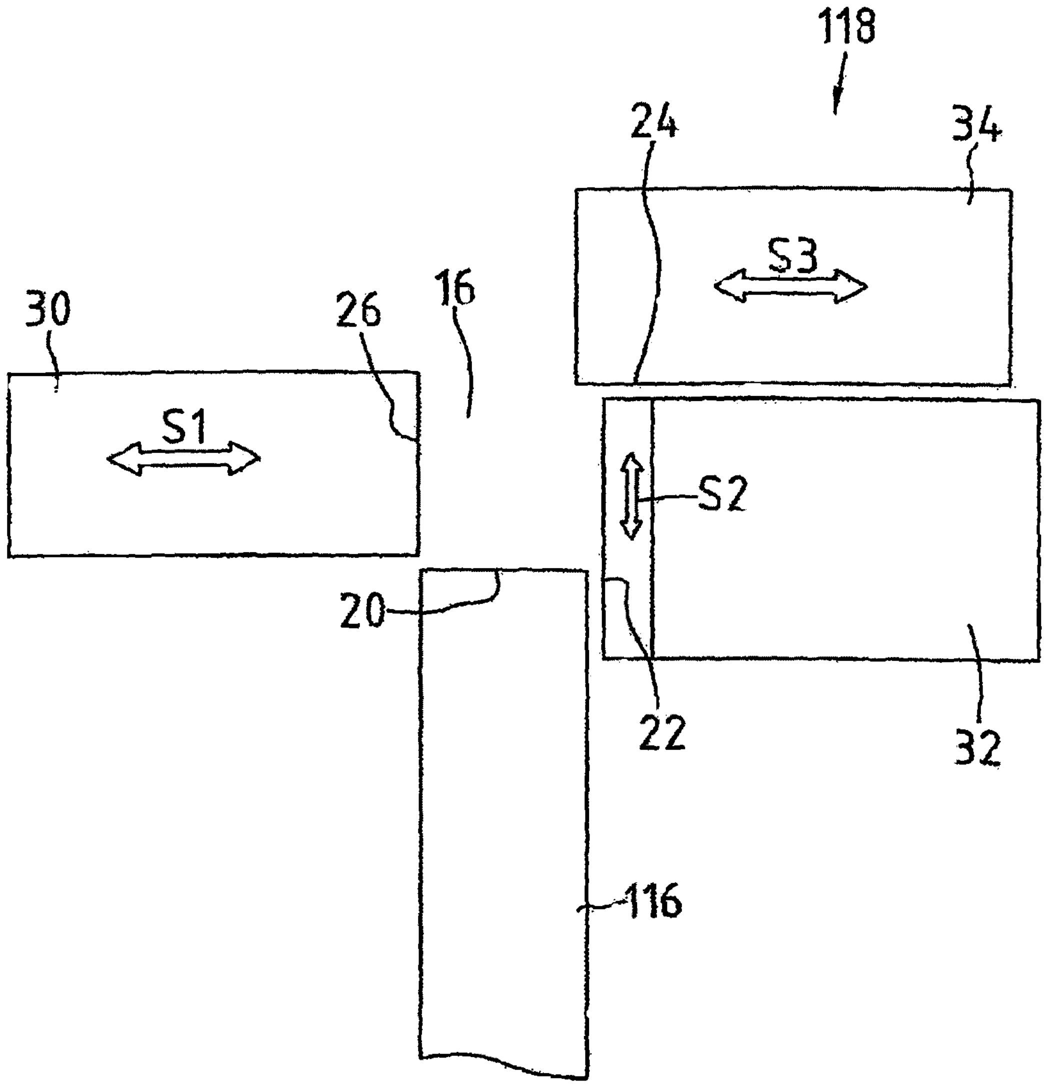
Figure 5:
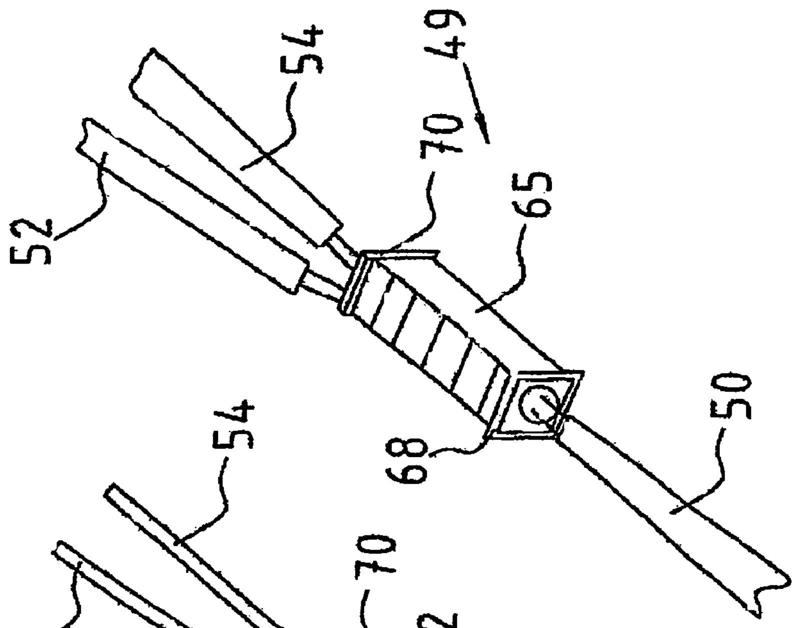
Figure 4:
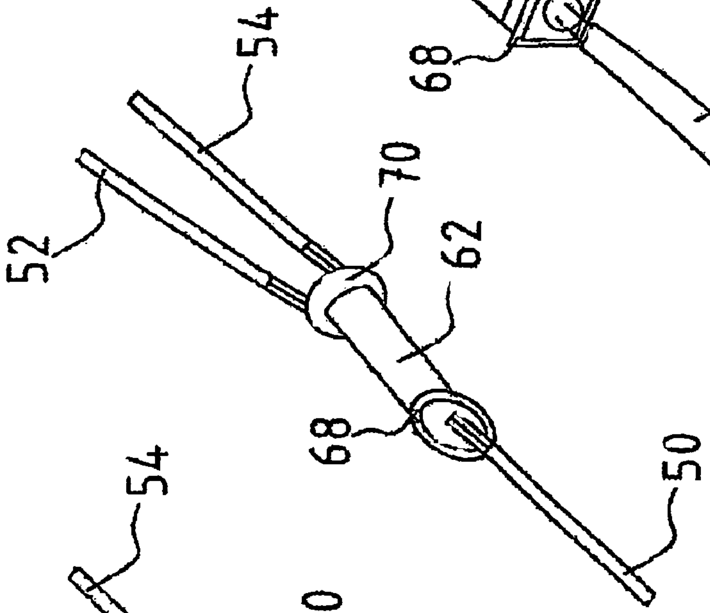
Figure 3:
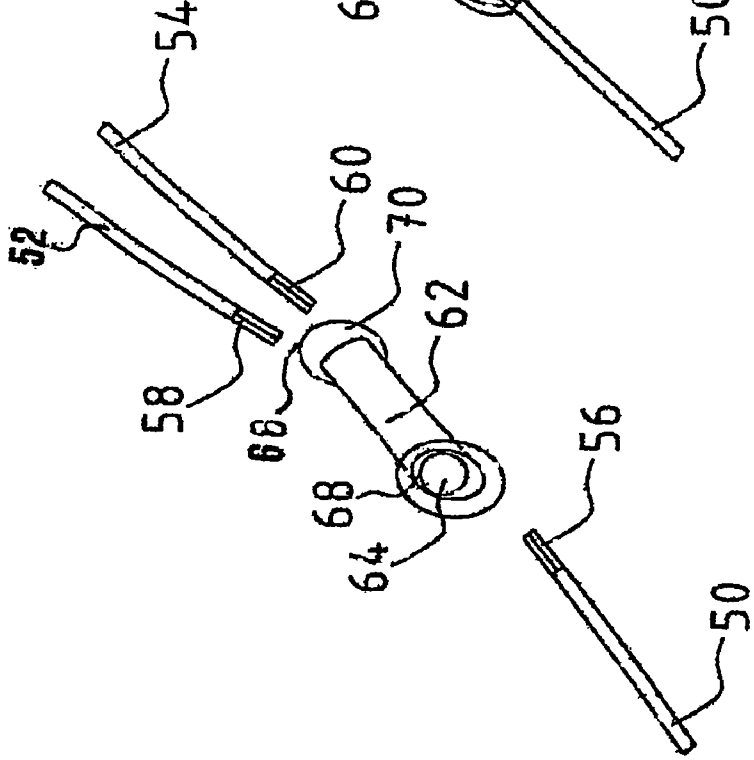
Figures 6, 7, 8:
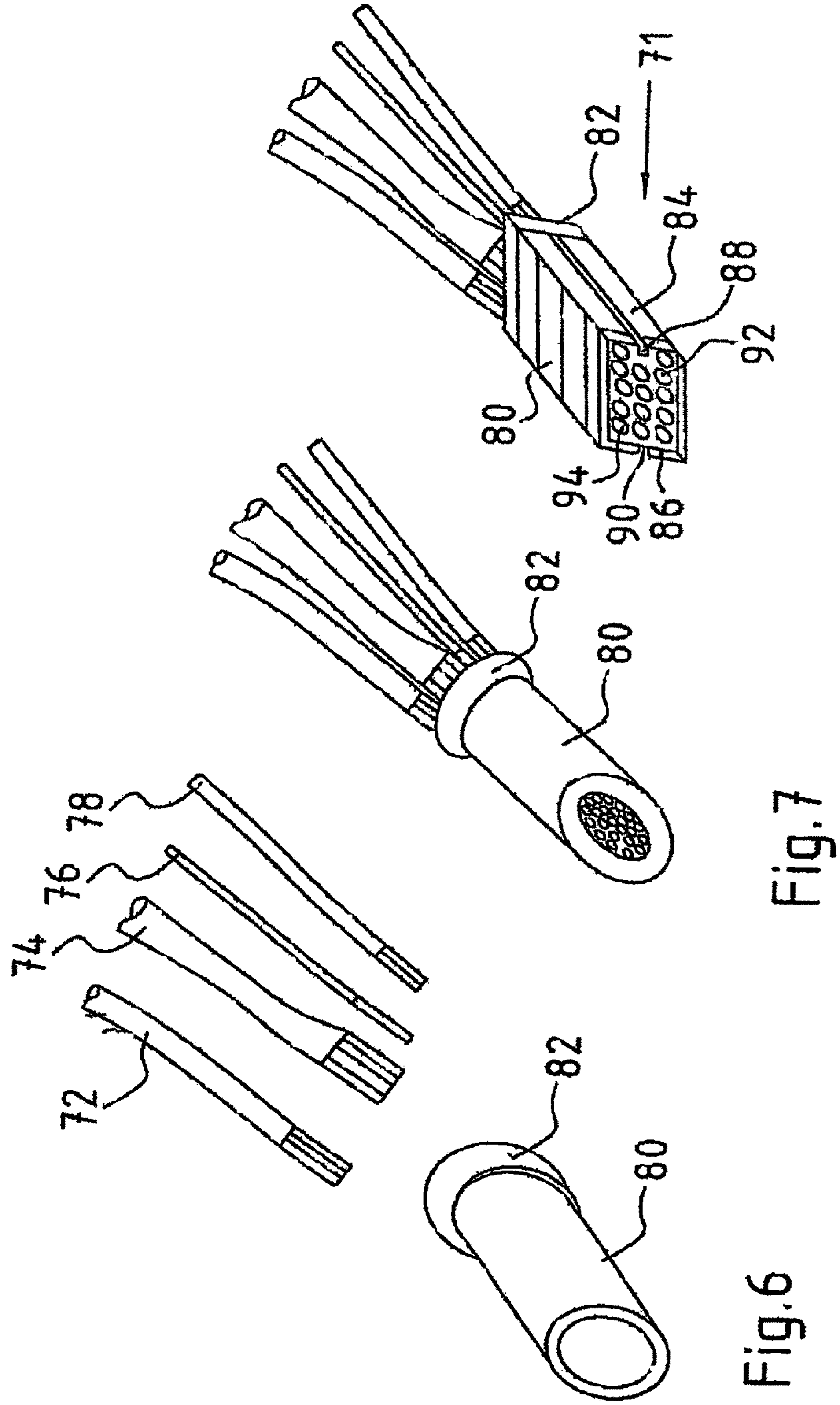
Figure 9:
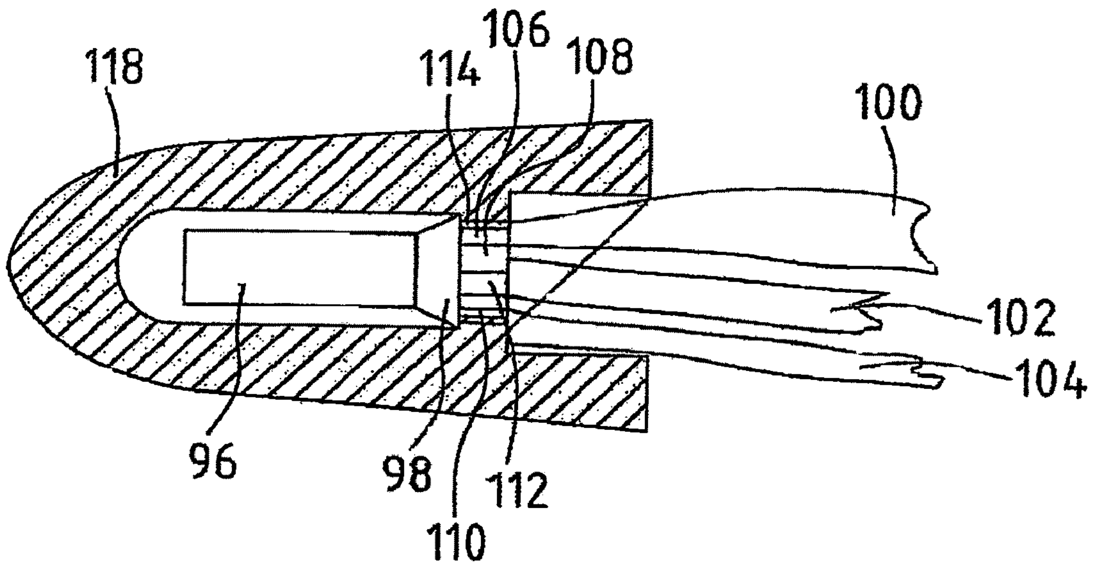
Figure 10:
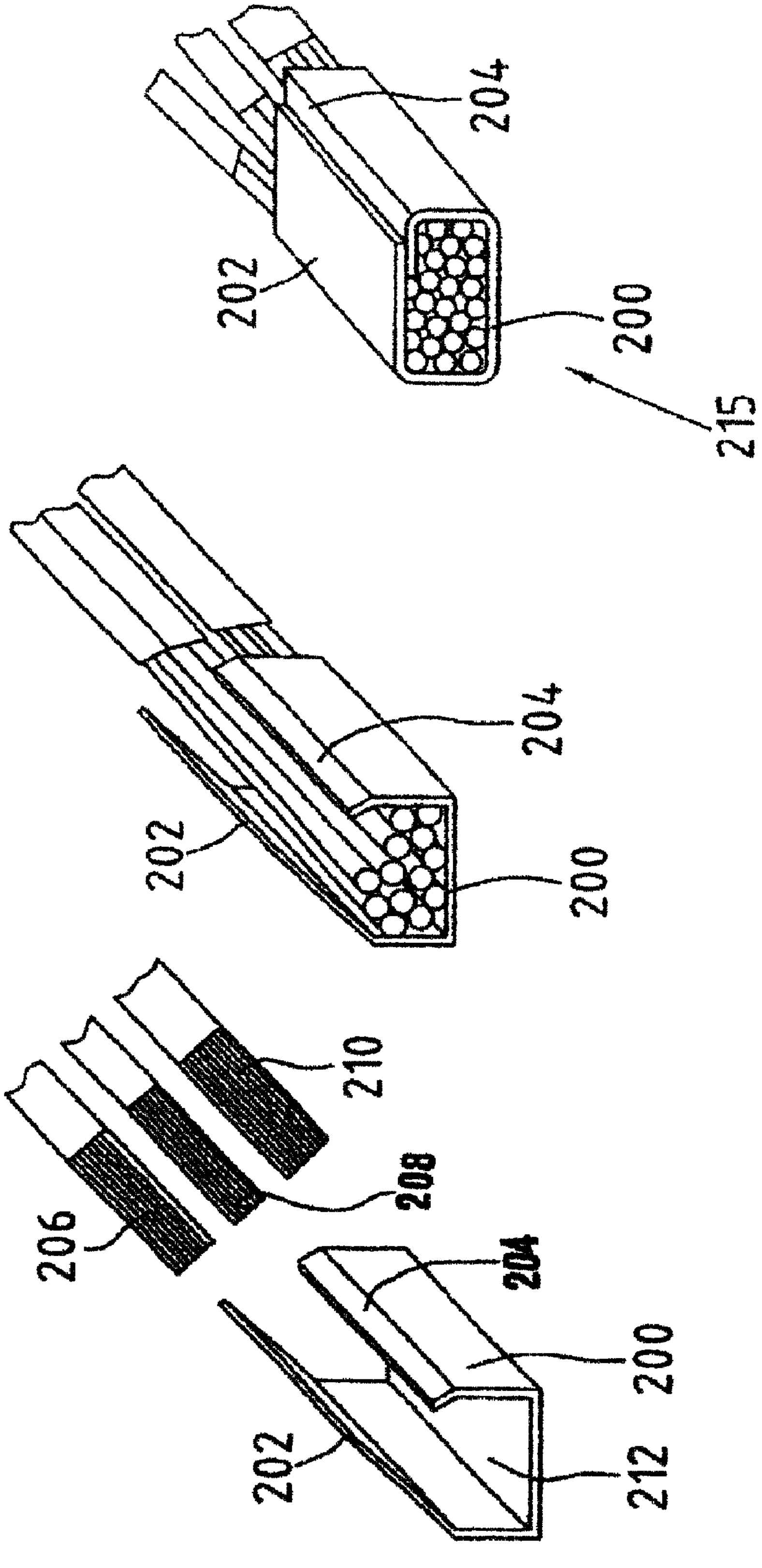
Figure 12:
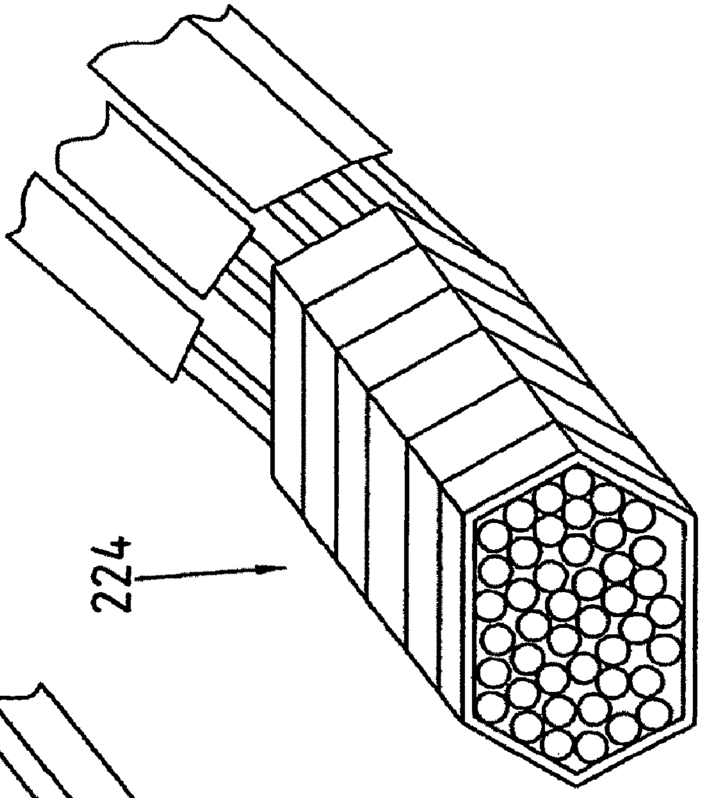
Figure 11:
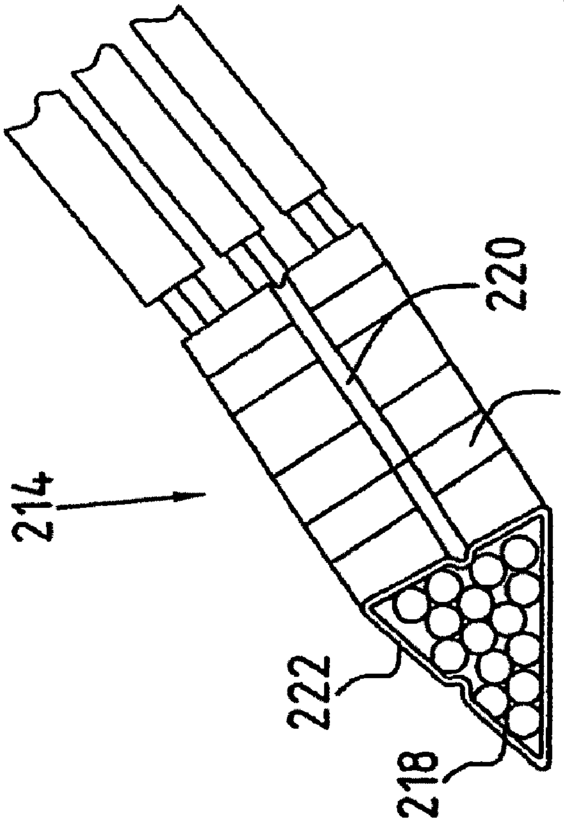

FIG. 2: a depiction in principle of a compression chamber adjustable in height and width FIGS. 3-5: a first embodiment of a connecting passage node for manufacture FIG. 6-8: a depiction in principle of an end node for manufacture FIG. 9: an end node surrounded by an insulating cap FIG. 10: an additional depiction in principle of the manufacture of an end node FIG. 11: an end node in a triangular column geometry FIG. 12: an end node in a hexagonal column geometry To faultlessly connect electrical conductors having differing materials or material properties, especially strands that may be configured of fine or very fine wires, into end nodes or connecting passage nodes using ultrasonic welding, whereby simultaneously high-level mechanical and dynamic load capacity is provided as well as good electrical contacting, and a cuboid-shaped end geometry is attainable, in accordance with the invention it is proposed that the conductors be first inserted into a sleeve, and then these be compacted and welded with the conductors in the compression chamber of an ultrasonic welding device.

A design in principle of an appropriate ultrasonic welding device is found in FIG. 1. An ultrasonic welding device or machine 110 in customary fashion comprises a converter 112, if necessary a booster 114, as well as a sonotrode 116. To the sonotrode 116 or a surface of it are assigned a multi-component counterelectrode 118—also called an anvil—as well as a slider 120. By means of the section of the counterelectrode 118 placed opposite the sonotrode 116, a force required through relative motion of the section is generated to the parts to be welded. After compression has been completed, the sonotrode 116 is made to oscillate, to carry out the welding process.

During compression, not merely the section of the counterelectrode 118 opposite the sonotrode 116, but also the slider 120 is shifted in the direction of the opposite limiter, thus of the section of counterelectrode 116 running vertically in the embodiment example.

The sonotrode 116 or its surfaces, the counterelectrode 118 with its vertical section, and slide 120 in the embodiment example constitute the limits of a compression chamber rectangular in cross section, that is explained in more detail using FIG. 2.

Naturally, the compression chamber can also have another cross section of a polygon especially, such as a triangle or hexagon, to manufacture end nodes or connecting passage nodes, that have the geometry of a polygonal column like a triangular column or a hexagonal column, as is made clear by FIGS. 11 and 12.

To make available a compression chamber of triangular cross section, and to compress and weld conductors surrounded by a sleeve, an ultrasonic welding device can be used, as can be found in WO-A-2005/021203, to whose disclosure specific reference is made.

The converter 112 is connected via line 122 with a generator 124, which for its part leads via a line 126 to a computer 128, from which the welding process is controlled. For this, welding parameters and the wall thickness of the sleeve as well as the cross section of the conductors to be welded are inputted, or appropriately stored values are retrieved.

FIG. 2 shows a depiction in principle of the compression chamber 16 of the ultrasonic welding device 110 of FIG. 1. In cross section, the compression chamber 16 exhibits a rectangular geometry and its front side is open, to guide the conductors to be welded through.

The compression chamber 16 has a first delimitation surface 20, that is formed by a section of the sonotrode 116. Opposite surface 20 extends a second delimitation surface 24, which is formed by a crosshead 34 that assumes the function of the counterelectrode or anvil 118, that proceeds from a vertically adjustable carrier 32, that forms a further delimitation surface 22 that runs perpendicular to delimitation surfaces 20, 24. Lying opposite to delimitation surface 22 a slider 30 is placed, that forms a fourth delimitation surface 26 running parallel to the first and second delimitation surfaces 20, 24, that runs parallel to delimitation surface 22.

When the sleeve with the conductors is inserted into the compression chamber 16, crosshead 34 is withdrawn as per the depiction in FIG. 2, so that compression chamber 16 is accessible from above. Naturally the possibility also exists to insert the sleeve from an open front side of compression chamber 16 into it. Especially this is to be preferred if the sleeve is to be positioned in compression chamber 16 with a desired pre-set length.

The direction of movement of crosshead 34, carrier 32, counterelectrode 118 and slider 40 are symbolized by arrows S1, S2 and S3. The result of this is that compression chamber 16 can be adjusted in height and width, to adapt a sleeve and conductors to be inserted into compression chamber 16 to be welded.

FIGS. 3-5 explain how a connecting passage node 49 is produced, through binding together the conductors 50, 52, 54 that consist of individual strands. For this, the conductors 50, 52, 54 that are otherwise surrounded by an insulation, are insulated in their ends, so that strands 56, 58, 60 of conductors 50, 52, 54 are exposed.

Naturally the invention is not abandoned if at least one of the conductors has an insulation in its areas to be welded. This would be suppressed during ultrasonic welding due to the loading with ultrasonic oscillations, so that the conductors are insulated and thus can be welded to each other as well as with the sleeve surrounding them.

Conductors 50, 52, 54, i.e. strands 56, 58, 60, may consist of differing materials. Thus, strands 56, 58, 60 may consist of aluminum, copper-plated aluminum or zinc-coated copper material or ferrous product like precious metal, without hereby incurring a limitation of the invention-specific teaching. Strands 56, 58, 60 can also be fine or very fine wire.

Preferably insulated strands 56, 58, 60 in the embodiment example are inserted into a sleeve 62 having a hollow cylinder geometry via its open front ends 64, 66, as is evident from a comparison of FIGS. 3 and 4. Then sleeve 62 with strands 56, 58, 60 that are inserted fundamentally insulated into it is inserted into compression chamber 16, to displace anvil 118 and slider 30 in such a way that sleeve 62 is drawn up in contact. Then sleeve 62 and strands 56, 58, 60 are compacted and welded owing to the ultrasonic excitation of sonotrode 116. When this occurs, sleeve 62 undergoes a change in shape resulting in a cuboid-shaped exterior geometry, as FIG. 5 makes clear. Sleeve 62 with strands 56, 58, 60 forms the connecting passage node 49.

In the embodiment example, sleeve 62 has bead-like or trumpet-like configured front edges 68, 70, that run outside the compression chamber 16 during compaction and welding. Despite that, during compacting and welding, the front edges 68, 70 assume a geometric progression that shows the exterior geometry of sleeve 65 after compacting and welding.

FIGS. 6-8 show in principle the manufacture of an end node 71 in which conductors or cables 72, 74, 76, 78 consisting of differing widths and/or of differing materials are inserted into a sleeve and then compressed and welded in compression chamber 16 in the manner and method described before. The sleeve 80 also has a hollow-cylinder geometry, whereby the edge running facing the conductors is expanded in trumpet fashion or is bead-like. During compression and welding the edge 82 runs outside compression chamber 16.

As a comparison of FIGS. 6-8 shows, sleeve 80 during compression and welding assumes the interior geometry of compression chamber 16, so that a final cuboid-shaped geometry results. During compaction of sleeve 80, thus when reshaped from the hollow-cylinder geometry into the hollow cuboid geometry, the areas 84, 86 of sleeve 80 that extend vertically in the embodiment example along delineation surfaces 22, 26 are compressed so that they are folded inward, as the FIG. 8 depiction makes clear. Thus, the side walls 84, 86 of sleeve 80 reshaped into a cuboid have folds 88, 90 directed inwards, that lead to an additional compression of the strands 90, 92 of conductors 72, 74, 76, 78 running inside sleeve 80, thus ensuring the required mechanical and electrically conducting contact between strands 90, 92 and thus the conductors 72, 74, 76, 78. The configuring of folds 88, 90 depends on the extent of the compaction and the relationship of the interior diameter of sleeve 80 to the overall cross section of conductors 72, 74, 76, 78 inserted into sleeve 80.

Apart from this, the interior cross section of sleeve 80 and the overall cross section of conductors 72, 74, 76, 78 can be adjusted to each other so that strands 72, 74, 76, 78 can be inserted or mounted into sleeve 80 with no problems, without negatively affecting the welded joint and the mechanical strength; since during compaction and welding the interior cross section of sleeve 80 is adapted to the overall cross section of strands 72, 74, 76, 78, whereby crushing causes the side walls 84, 86 of sleeve 80 to be folded inward at least in sections.

In addition, FIG. 8 shows that after compaction and welding of conductors 72, 74, 76, 78, edge 82 of sleeve 80 demonstrates a progression that corresponds to that of sleeve 80 in its final geometry.

A sleeve coated on the inside and/or outside, especially one made of a metal like nickel or copper, or containing copper, or with another suitable material, is used as the sleeve, which is customarily available and is thus cost-effective. The walls of sleeves 62, 80 should be between 0.05 and 0.5 mm thick, especially between 0.15 and 0.4 mm, to ensure reshaping to the required extent during compression and welding in compression chamber 16, whereby simultaneously side walls 84, 86 can fold inward as desired.

As FIGS. 3-8 show in principle, the insulations of conductors 50, 52, 54, 72, 74, 76, 78 terminate at a distance from the particular front end of sleeves 62, 80, that a virtually surrounding recess is produced, as this is shown in principle in FIG. 9. Thus a sleeve 96 is depicted with an expanded edge 98, at a distance the insulations 100, 102, 104 of conductors not shown in greater detail, whose strands 106, 108, 110 have been welded with sleeve 96 into an end node. In the annular recess 112 thus formed, in the embodiment example an annular encircling inner projection 114 of an insulating cap 118 engages, which surrounds sleeve 96 and which extends into the area of insulations 100, 102, 104. This results in a mechanical locking of insulating cap 118.

If with the embodiment examples explained before, an encircling closed sleeve, especially of a cuboid-shaped exterior geometry, was used, to insert electrical conductors into it, and weld them to each other, then by this the invention-specific teaching is not limited. Rather, the possibility also exists to use sleeves that are open on the circumferential side, which then during compaction and welding are closed and are welded with the strands inserted into them. This is made clear using FIG. 10. Thus, a body is used as the sleeve 200 that in its original state has a U-shaped geometry, from whose longitudinal edges, angled laminar sections 202, 204 project, resulting in a virtually open box with free front surfaces. Then, the insulated ends 206, 208, 210 of electrical conductors are inserted into sleeve 200, that can consist of differing materials and/or differing cross sections. After insertion of the insulated ends 206, 208, 210 into the interior space 212 surrounded by sleeve 200, the strand-sleeve unit is inserted into a compression chamber of an ultrasonic or resistance welding device, to then be compacted and welded. An end node 215 results, as is shown in the right drawing of FIG. 10 purely in principle. One can simultaneously recognize that the sections 202, 204 possess a width so that at least after the compacting and welding processes they overlap one another and thus are welded.

Even if, in the FIG. 10 embodiment example, a node with a rectangular cross section is shown in principle, by this the invention-specific teaching is not limited. Rather, the possibility exists to manufacture connecting passage nodes or end nodes that have a form deviating from the cuboid geometry. This is seen in FIGS. 11 and 12. Thus, in FIG. 11 an end node 214 is depicted that has the geometry of a triangular column. Consequently, welding can be conducted in a device such as is described in WO-A-2005/021203. We recognize that the walls 216, 218 of the sleeve adjoining the sections of the counterelectrode have folds or pleats 220, 222 directed inward, which arise owing to the compaction.

FIG. 12 shows a node 224 that has the geometry of a hexagonal column.

The invention claimed is:

1. A connecting passage node or end node comprising:

a plurality of strands compressed and welded with each other, wherein the connecting passage node or end node has the geometry of a polygonal column like a cuboid form, the plurality of strands are surrounded by a sleeve with the exterior geometry of a polygonal column, that is the outer layer of the connecting passage node or end node, wherein the sleeve is cuboid on the circumferential side in its end geometry, as part of the connecting passage node or end node, and wherein said sleeve comprises opposing side walls, said opposing side walls having inwardly folding sections, and whereby at least one of the following occurs: (1) the sleeve expands in trumpet fashion at the end, and (2) the sleeve is reinforced in bead fashion at its open end.

2. A connecting passage node or end node according to claim 1, wherein the exterior geometry of a polygonal column is a cuboid-formed one.

3. A connecting passage node or end node according to claim 1, wherein the end node is surrounded by an insulating cap with an encircling projection extending from its inner surface, that is locked in the intermediate space between the end of the sleeve running on the conductor side and, running at a distance to this, the insulations of strands.

4. A connecting passage node or end node according to claim 1, wherein the sleeve comprises a metal like nickel or copper or aluminum, or, on one selected from the outer side and the inner side, of coated copper.

5. A connecting passage node or end node according to claim 1, wherein the sleeve has a wall thickness D of 0.05 mm≦D≦0.5 mm.

6. A connecting passage node or end node according to claim 1, wherein the sleeve is closed in its surrounding uncompressed state.

7. A connecting passage node or end node according to claim 1, wherein the sleeve has a wall thickness D of 0.15 mm≦D≦0.4 mm.

8. A connecting passage node or end node according to claim 1, wherein said sleeve comprises opposing side walls, and said side walls are folded inwardly.

9. A connecting passage node or end node comprising:

a plurality of strands compressed and welded with each other, wherein the connecting passage node or end node has the geometry of a polygonal column like a cuboid form, the plurality of strands are surrounded by a sleeve with the exterior geometry of a polygonal column, that is the outer layer of the connecting passage node or end node, wherein said sleeve comprises opposing side walls, and said side walls are folded inwardly, and whereby at least one of the following occurs: (1) the sleeve expands in trumpet fashion at the end, and (2) the sleeve is reinforced in bead fashion at its open end.

10. A connecting passage node or end node according to claim 9, wherein the exterior geometry of a polygonal column is a cuboid-formed one.

11. A connecting passage node or end node according to claim 9, wherein the sleeve is cuboid on the circumferential side in its end geometry, as part of the connecting passage node or end node, and wherein said sleeve comprises opposing side walls, said opposing side walls having inwardly folding sections.

12. A connecting passage node or end node according to claim 9, wherein the end node is surrounded by an insulating cap with an encircling projection extending from its inner surface, that is locked in the intermediate space between the end of the sleeve running on the conductor side and, running at a distance to this, the insulations of strands.

13. A connecting passage node or end node according to claim 9, wherein the sleeve comprises a metal like nickel or copper or aluminum, or, on one selected from the outer side and the inner side, of coated copper.

14. A connecting passage node or end node according to claim 9, wherein the sleeve has a wall thickness D of 0.05 mm≦D≦0.5 mm.

15. A connecting passage node or end node according to claim 9, wherein the sleeve is closed in its surrounding uncompressed state.

16. A connecting passage node or end node according to claim 9, wherein the sleeve has a wall thickness D of 0.15 mm≦D≦0.4 mm.

17. A connecting passage node or end node according to claim 13, wherein the coated copper is selected from the group consisting of silver-plated copper, gold-plated copper, and nickel-plated copper.

18. A connecting passage node or end node according to claim 4, wherein the coated copper is selected from the group consisting of silver-plated copper, gold-plated copper, and nickel-plated copper.

* * * * *